Figure 1:
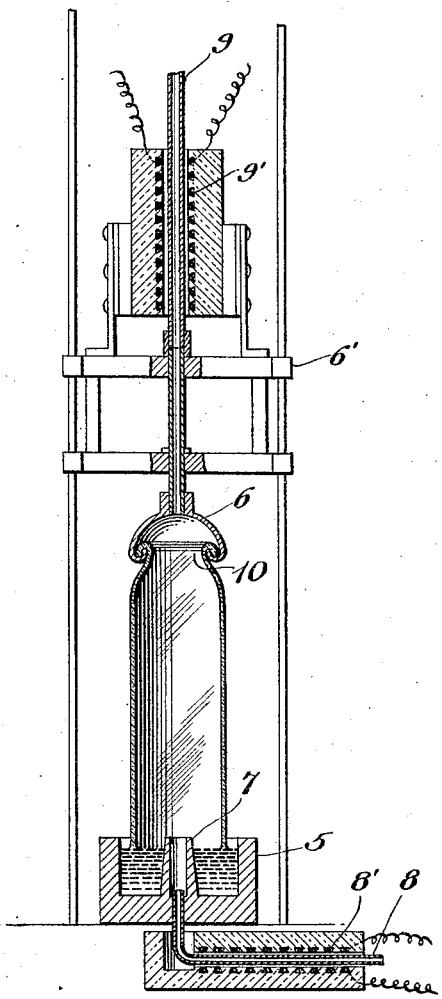

July 21, 1925.

T. STENHOUSE 1,546,949

METHOD OF DRAWING GLASS CYLINDERS

Filed Dec. 2, 1919

Inventor
Thomas Stenhouse,
By Attorney C. P. Goepel.

Patented July 21, 1925.

1,546,949

UNITED STATES PATENT OFFICE.

THOMAS STENHOUSE, OF WASHINGTON, PENNSYLVANIA, ASSIGNOR, BY DIRECT AND MESNE ASSIGNMENTS, OF ONE-SIXTH TO ALEXANDER L. DUVAL D'ADRIAN, OF WASHINGTON, PENNSYLVANIA, AND ONE-SIXTH TO BERNHARD F. DRAKENFELD, JR., OF NEW YORK, N. Y.

METHOD OF DRAWING GLASS CYLINDERS.

Application filed December 2, 1919. Serial No. 341,974.

*To all whom it may concern:*

Be it known that I, THOMAS STENHOUSE, a citizen of the United States, residing in the town and county of Washington and State of Pennsylvania, have invented new and useful Improvements in Methods of Drawing Glass Cylinders, of which the following is a specification.

This invention relates to the art of drawing glass cylinders in the manufacture of window glass, and more particularly to that step in the method of mechanically drawing glass cylinders whereby the diameter of the cylinder is maintained uniform throughout the entire length of the draw.

As a result of recent developments in the manufacture of window glass, glass cylinders have been mechanically drawn to a length as great as forty feet, and from thirty to forty inches in diameter, with more or less success. In the operation of such mechanical cylinder drawing apparatus, a bait is used in conjunction with a pot which contains the bath of molten glass. Through the medium of suitable winding mechanism, this bait is raised at a regulated speed and the cylinder is progressively formed, the walls of the cylinder being distended and supported against collapse by the admission of air to the interior of the cylinder. It has been found, in the drawing of such glass cylinders, that difficulties in the uniform formation of a cylinder of the requisite diameter are encountered, and these difficulties are primarily due to pulsations caused within the cylinder during the process of supplying air to the cylinder in order to maintain the necessary pressure therein, which determines the diameter of the cylinder during the draw. These pulsations, which occur intermittently during the drawing operation, result in the formation of irregular distentions of the cylinder body, and correspond to the varying degree of internal intensity or stress caused by the air pulsations upon the wall of the cylinder. Heretofore, it has been the practice to supply air at atmospheric temperature to the interior of the cylinder, and proportionately increase the air supply as the length of the cylinder increases to thereby compensate for the shrinkage in volume of the compressed air which is caused by the gradual cooling of the cylinder walls. Such air when first admitted to the cylinder at the start of the draw, is, of course, in proximity to the molten glass bath and is therefore heated. However, as the cylinder is elongated by the elevation of the bait, the air subsequently admitted to the cylinder, is relatively cool.

The precise cause of the air pulsations within the body of the cylinder above referred to, has not as yet been definitely determined by experts in the art. Upon the hypothesis that these pulsations were caused by the admission of air at atmospheric temperature or at a temperature less than the normal temperature within the cylinder, and that the heat radiated from the surface of the glass in the pot caused an abnormal expansion of the cold air near the surface of the bath which in ascending met and mingled with the incoming cold air in its descent, and thereby caused a violent regurgitation of the body of air during the equalization of temperatures and with a corresponding expansion of the gases; I have discovered that when the air employed for the purpose of distending the cylinder to its proper diameter, is preheated to a temperature approximating the normal temperature within the cylinder at the surface of the bath, and is introduced in predetermined volume controlled by an ordinary regulating valve arranged in the air supply pipe, such pulsations do not take place.

The maintenance of a uniform pressure within the cylinder while primarily governed by volume is nevertheless materially affected by temperature. Thus, if as above stated there are within the cylinder two or more bodies or currents of air of relatively different teperatures and which, therefore, are promotive of opposed influences within the cylinder, it is manifest that an inconstant, fluctuating air pressure will result and thereby cause an uneven distribution of pressure upon the cylinder wall as the length of the cylinder increases, so that the wall of the cylinder is in some places distended while in others it is contracted and assumes an undulating or corrugated appearance.

An attempt to minimize the presence of such eddying or pulsating air currents within the cylinder and thereby nullify their effects, has been made by providing a vent in the air supply line. Such attempt has been only partially successful since the condition existing was erroneously attributed to an over-supply of air and not to the true cause, namely, differences in air temperatures within the elongated cylinder.

Having therefore discovered the fundamental cause of the many failures in drawing glass cylinders to perfect diametrical uniformity, it is the aim and purpose of my present invention to apply an effective remedy. To this end I propose to supply air to the interior of the cylinder, which is preheated to substantially the same temperature as the normal temperature of the interior of the cylinder at the surface of the bath, and to regulate the volume of this preheated air so that it will at all times be exactly commensurate with the gradually increasing cubic area of the cylinder as the latter is elongated by the lifting of the bait. The term "normal temperature" signifies the temperature prevailing at the beginning of a glass blowing operation.

Thus the incoming air which enters the cylinder at the beginning of its formation will not be caused to pulsate by interchange of heat between it and the bath, and the air which subsequently enters the cylinder will diffuse gently into the body of air already contained in the cylinder without generating pulsations such as have heretofore frequently caused the formation of irregularities in the cylinders. It is very important that these pulsations heretofore attendant upon admission of the air to the cylinders shall be prevented, since applicant has found that in the absence of such pulsations the currents of air in the cylinder caused by convection or otherwise may be dampened so as to exert little or no deleterious influence in the formation of the cylinder. In other words, applicant's investigations are believed to have established the fact that convection and other phenomena incident to the blowing of glass cylinders and tending to create air currents within the cylinders do not create currents of such intensity and strength as to produce irregularities in the cylinder, unless such air currents are augmented by more extensive pulsations arising from the initial introduction of air to the cylinder.

In one embodiment of my invention I propose to admit the preheated air to the interior of the cylinder through the pot or through the cylinder forming bait, though if desired, the simultaneous admission of air through both the pot and the bait may be employed. For example, air may be simultaneously admitted through both the pot and bait at the beginning of the formation of a cylinder. When, however, the cylinder has been built up to a length such that its upper end is appreciably cooler than its lower end, the admission of air through the bait may be entirely discontinued or reduced to the amount necessary to prevent cracking of the glass from the bait. The air for supporting the cylinder during the remainder of its formation is preferably admitted to it through the pot and at substantially the temperature prevailing in the cylinder at the surface of the bath. I also propose to disseminate or diffuse the heated air at its point of admission so as to eliminate as far as possible, the creation of circulatory currents of air within the cylinder, and more effectively obtain a uniform distribution of the heated air or gas throughout the interior of the cylinder.

Figure 2:
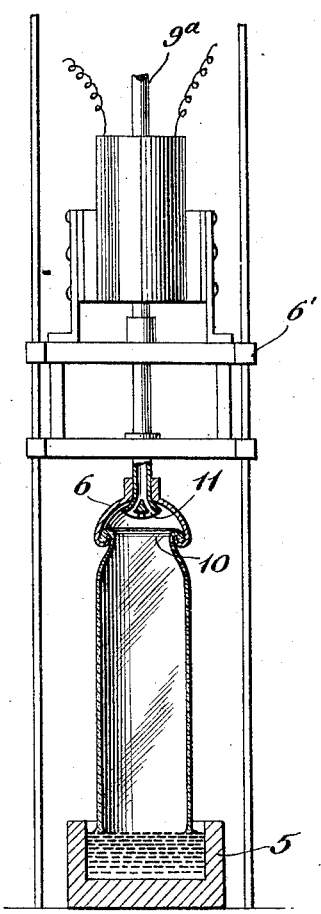

In the accompanying drawing wherein I have illustrated, more or less diagrammatically, several forms of apparatus whereby my present improvements may be successfully practiced, and in which similar reference characters designate corresponding parts throughout the several views, Fig. 1 is a vertical sectional view through the glass pot and a partly formed cylinder, illustrating one manner in which the objects of the present invention may be attained; and Fig. 2 is a similar view illustrating a slightly modified arrangement for effecting a thorough diffusion of the heated air throughout the interior of the cylinder.

Referring in detail to the drawing, 5 designates a pot to contain the molten glass. This pot may be of any approved form now in common use in connection with glass drawing apparatus. The bait 6 may also be of any well known type, and this bait in the practice of the art, is mounted upon a vertically movable frame 6', which is suitably connected to a winding or drawing apparatus whereby the bait may be raised or lowered.

In the present instance I have shown the pot 5 provided with a central upstanding nozzle 7 to which an air supply tube or pipe 8 is connected through the bottom of the pot. The upper open end of this air nozzle is disposed above the level of the molten bath of glass which is contained in the pot 5.

An air supply tube 9 also extends axially through the bait 6. The tubes 8 and 9 are each provided with suitable regulating valves whereby the volume of air flowing through said tubes may be suitably regulated and controlled. The air supplied through both of these tubes to the interior of the glass cylinder, is preheated by suitable means, to the requisite temperature. In the illustrated embodiment of my invention I have shown electrical resistance units 8' and 9' respectively, for the purpose of heating the air in its passage through said tubes. However, if desired, suitable gas or oil burners may be provided for this purpose. The temperature of the air is determined in accordance with the desired length and diameter of the cylinder to be drawn, and the requisite thickness of the cylinder walls, which in turn is governed by the speed with which the bait 6 is lifted or elevated.

In practice, the bait 6 is lowered into engagement with the surface of the molten bath of glass in the pot 5 so that the glass will adhere to the perimeter of the bait. Initially or when the bait is first lifted, a small amount of air is admitted so as to form the neck portion 10 of the cylinder. More air is then admitted simultaneously through the tubes 8 and 9 as the drawing operation continues so as to distend the glass and form the cap portion of the cylinder of the desired diameter. The initial inlet of heated air may be through either of the tubes 8 or 9 and as the drawing operation is continued, heated air may be admitted to the interior of the cylinder from said tubes in equal proportion and in a combined volume which gradually increases as the cubic area of the interior of the cylinder is increased by the lengthening or elongation of the cylinder. These heated air currents admitted to the cylinder from opposite directions, will commingle and as they are of the same temperature, they will diffuse or merge into each other without causing pulsations or other strong or irregular movements of the air, so that the air will exert a steady uniform pressure upon all portions of the cylinder walls. When the cylinder attains a length such that its upper end is appreciably cooler than its lower end, the admission of air through the bait 6 is preferably discontinued or at least greatly reduced and the main body of the air for supporting the cylinder is introduced into it through the pot. When the air is admitted in this manner and at the temperature prevailing in the cylinder at the surface of the bath, the column of air becomes gradually cooler from the bottom to the top of the cylinder, in a ratio approximating that of the cooling of the glass cylinder, the temperature of the air at any horizontal section of the cylinder being substantially uniform throughout its sectional area. This result is obtained by the avoidance of the pulsations heretofore incident to the admission of the air into the cylinder. These pulsations as above indicated are harmful not only because of their direct action but also because they give rise to and greatly accelerate convection currents within the cylinder. In the absence of such pulsations, whatever air currents may be set up in the cylinder are very slow and gentle so that the temperature of the air through any horizontal section of the cylinder is substantially uniform. Such air currents as may occur in the glass cylinders when the heretofore described pulsations are avoided, do not form irregularities in the cylinder or otherwise injuriously affect it. Moreover, the formation of glass cylinders without irregularities or distortions is facilitated because of the fact that by reason of the uniform cooling of the air within them the cylinders are cooled substantially uniformly at all points of their horizontal sections. As the volume of heated air admitted to the cylinder is proportionately controlled and regulated in accordance with the increasing length of the cylinder, the pressure of the air will remain constant and invariable throughout the length of the draw.

If desired, all of the preheated air may be admitted through a single tube connected to the bait 6, and the supply tube 8 and the nozzle 7 on the pot dispensed with. When the air is admitted through the bait at substantially the normal temperature within the cylinder at the surface of the bath, there is at the beginning of the blowing operation no tendency to cause pulsations within the cylinder since the bait is close to the surface of the bath. As the length of the cylinder increases the cylinder at its upper end becomes cooler than at its lower end so that the air as it enters through the bait is at a higher temperature than the upper end of the air column. By reason, however, of the tendency of hot air to rise and because of the avoidance of pulsations in the initial admission of air to the cylinder, the air supply to the upper end of the cylinder cools gradually to the temperature of the mass of air in the upper end of the column and without setting up any strong or injurious air currents. On the other hand, the heated air may be supplied only through the pot 5, and the air supply connection to the bait can be eliminated. I prefer in carrying out my improved method, to admit the greater portion of the air, at least during the latter part of the operation of forming a cylinder through the pot, because during a drawing operation the temperature within the cylinder near the pot does not undergo much change so that the incoming air may be readily caused to enter the cylinder at substantially the same temperature as the air with which it mingles upon its entrance into the cylinder.

In Fig. 2 of the drawings I have shown a slightly different form of the apparatus wherein the preheated air is admitted to the interior of the cylinder through a single tube 9ª, connected to the bait, and this tube terminates in a distributing nozzle 11. This nozzle breaks up the current of heated air at its point of emission and directs the same in the form of a conical shaped spray or stream outwardly and downwardly so that it will flow in proximity to the cylinder walls. Thus, the heated air is diffused uniformly throughout the transverse sectional area of the cylinder and is continually commingling with the air initially admitted into the cylinder so that throughout its entire body the air in the transverse sectional areas of the cylinder is constantly maintained at a substantially uniform temperature. In either form of the apparatus as herein disclosed, it will be apparent that the formation of separate currents of air within the cylinder, of relatively different temperatures, is avoided to the greatest possible degree so that eddying or pulsating air currents will not be created therein, and uniformity in diameter of the cylinder or the thickness of its walls will not be affected. As above noted, a common type of regulating valve may be employed for controlling the volume of heated air admitted to the cylinder and in the admission of air through the pot containing the glass bath, the air will be further heated during its passage through the nozzle 7. Admission of heated air through the bait at all times in sufficient quantity to keep it warm is also a desirable feature. Since the material of the bait has a different coefficient of expansion from that of the glass directly in contact therewith, a rupture is apt to result at the point of connection of the cylinder to the bait. The preheated hot air which passes through the bait will therefore heat the walls of the bait, as well as the glass in immediate contact therewith and maintain the same at a more equable temperature throughout the drawing operation and thereby minimize the tendency of breakage or rupture. In this way, also, I have eliminated the necessity of providing other artificial heating means for the bait.

From the foregoing description considered in connection with the accompanying drawing, my improved method of drawing glass cylinders will be fully understood. By supplying heated air to the interior of the cylinder in properly regulated volume as the cylinder is drawn, the progressive change in the glass from a plastic to a solid condition takes place without interruption. When air is admitted to the cylinder at atmospheric temperature as has heretofore been the case, the air temperature in different portions of the transverse sectional area of the cylinder will be different so that at one point where the air is relatively cool, there will be comparatively little distending pressure exerted against the cylinder wall while at another point where the air is comparatively hot, the expansion thereof will cause a greater pressure against the wall of the cylinder. This latter portion of the cylinder being in a more plastic condition, it will be distended beyond the required diameter of the cylinder. The cooler air currents within the cylinder acting upon the glass cylinder in a hot plastic condition will contract the cylinder wall. In this manner, the cylinder becomes deformed, and presents an undulating or corrugated appearance. Therefore, it will be appreciated that by regulating and controlling the temperature of the air which is admitted to the cylinder as well as the volume thereof, such distension and contraction of different portions of the cylinder wall are obviated, and by the maintenance of uniform temperature throughout the areas of its transverse sections and uniform pressure within the cylinder throughout the length of the draw, a cylinder having a wall of the required thickness and of constant diameter throughout the cylinder length, may be produced. Of course, it is understood that for a predetermined thickness of the cylinder wall the bait must be lifted at a properly regulated speed, since the molten glass bath as well as the walls of the cylinder formation is constantly cooling during the draw.

The bait itself that has been shown in the drawings is what is known in the art as a cold bait. The glass contracts away from the bait, but the ring of the bait holds it thereto. The temperature of the gas entering the bait or entering the lower inlet 7, or that which enters both at the same time, approximates the normal temperature within the cylinder as hereinbefore stated.

In the accompanying drawings I have disclosed several contemplated forms of apparatus whereby my invention may be carried out in practice, but it is to be understood that the apparatus might also be exemplified in numerous other alternative constructions. Accordingly, the privilege is reserved of adopting various changes in the form, construction and arrangement of the several parts of the apparatus as might be found advisable within the spirit and scope of the appended claims.

I claim:

1. The method of drawing hollow glass articles, which consists in drawing a hollow article from a bath of molten glass, introducing a preheated fluid into the opposite ends of the hollow article, and increasing the volume of such fluid admitted to each end of the article in proportion to the progressively increasing length of the article.

2. The method of drawing hollow glass articles, which consists in drawing a hollow article from a bath of molten glass, directing diffused currents of heated air into the opposite ends of the article, and increasing the volume of such diffused air currents proportionately to the increasing length of the article to maintain a constantly uniform pressure within the article.

In testimony that I claim the foregoing as my invention, I have signed my name hereunder.

THOMAS STENHOUSE.